(No Model.)

W. PEAD.
ANIMAL TRAP.

No. 443,975. Patented Dec. 30, 1890.

WITNESSES:
F. McArdle
C. Sedgwick

INVENTOR:
W. Pead
BY
Munn & Co.
ATTORNEYS

UNITED STATES PATENT OFFICE.

WALTER PEAD, OF DURBAN NATAL, SOUTH AFRICA, ASSIGNOR TO SYDNEY FORD AND THOMAS MORTIMER FORD, BOTH OF BRISTOL, ENGLAND.

ANIMAL-TRAP.

SPECIFICATION forming part of Letters Patent No. 443,975, dated December 30, 1890.

Application filed June 23, 1890. Serial No. 356,377. (No model.)

*To all whom it may concern:*

Be it known that I, WALTER PEAD, of Great Britain, residing in the town of Durban Natal, South Africa, have invented a new and Improved Animal-Trap, of which the following is a full, clear, and exact description.

The object of my invention is to produce a simple and reliable trap which may be used to catch alive all vermin of the rodent species, or, if made suitably strong, be employed to captivate wild animals of various kinds.

To this end my invention consists in the construction and combination of parts, as is hereinafter described, and indicated in the claims.

Reference is to be had to the accompanying drawings, forming a part of this specification, in which similar letters of reference indicate corresponding parts in all the figures.

Figure 1:
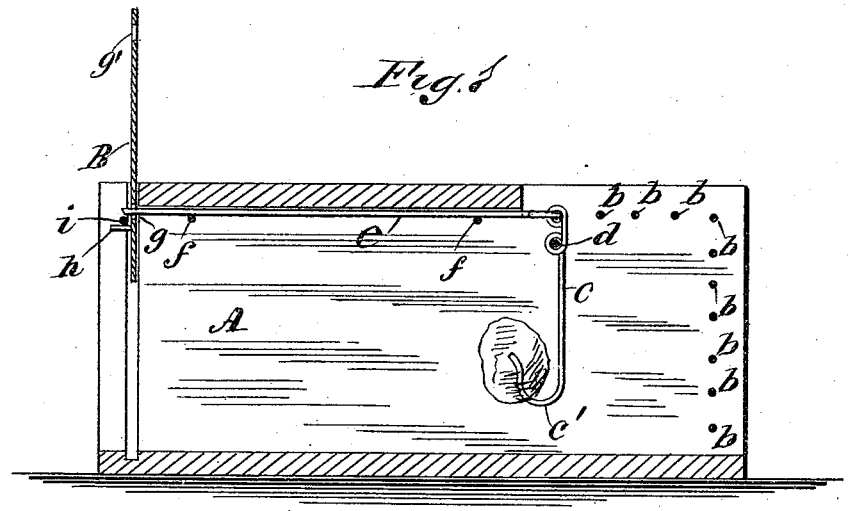
Figure 2:
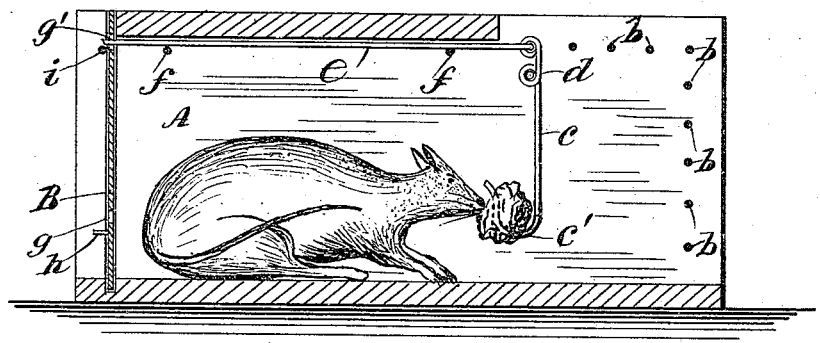
Figure 3:
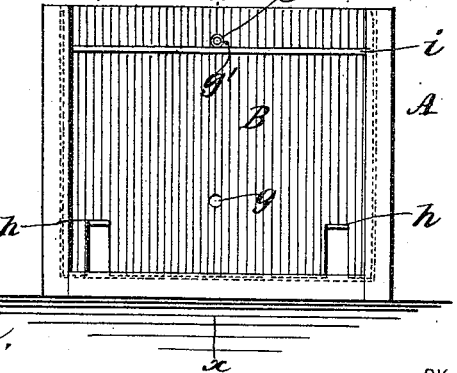

Figure 1 is a side elevation in section, taken on the line $x$ $x$ in Fig. 3, showing the trap adjusted to catch vermin of the rodent type. Fig. 2 is a side elevation in section on the same line as in the previous figure with the parts in closed adjustment and a caged mouse therein, and Fig. 3 is an end elevation with the trap in closed condition.

The main portion A of the trap is rectangular in form, made of wood or metal. One end of the box A is closed with wire rods $b$, which are inserted or otherwise attached at spaced intervals to the side walls of the same. A portion of the cover or top of the box A is removed and wire rods substituted, admitting light freely to expose the bait, the rods $b$ on top being aligned with the upper wall of the box. These are all sufficiently close to prevent escape of a mouse, the trap being especially well adapted to catch such vermin. At the opposite end of the box A aligning grooves are formed in the sides and bottom wall for the reception of a sliding gate B, made of metal, having sufficient weight to assure its quick descent when released, the gate fitting in the grooves of the sides loosely, and in like manner embedding its lower edge in the groove of the bottom, whereby the aperture is securely sealed when the gate is in lowered adjustment and no shoulders presented for gnawing action by the entrapped rodent.

At a proper point, preferably near to the front edge of the top piece of the box A, a bait-hook $c$ is pivotally suspended upon the transverse wire rod $d$, that engages firmly with the side walls of the box A, the bend $c'$ of the pendent hook, which is produced on its lower end, being adapted to engage and retain any suitable bait. The bait-hook $c$ is located near the transverse center of the box A, and above the point of suspension near to it an eye is turned on the upper end portion of the hook $c$ to receive a close hook formed on the longitudinally-extended trigger-bar $e$, that is supported to slide upon transverse rods $f$, placed near the inner surface of the upper wall of the box A.

A small orifice $g$ is made in the gate B near its lower edge and at its transverse center, thus aligning the small hole with the free end of the trigger-bar $e$, and above, in line with the hole $g$, a similar hole $g'$ is made. Two lugs $h$ are formed on or secured to the gate B near its side edges, so as to project in the same horizontal plane from its outer surface, these being designed to impinge upon a transverse rod $i$, that is inserted through the side walls of the box A, in the same plane with the trigger-supporting rods $f$, said rod $i$ serving to maintain loosely the extremity of the trigger-bar, and also serving as a stop-bar to limit the upward movement of the gate B, which will prevent accidental displacement of the gate at any time.

In use the pendent hook $c$ is baited, care being taken to fasten the material securely, so as to require a forcible pull to get a portion off of the hook. The trigger-bar $e$ is now inserted through the orifice $g$ and the weight of the elevated gate B allowed to rest on the extreme end portion of said rod.

For the proper operation of the device the length of the trigger-bar $e$ should be so proportioned to the distance from the gate B to the bait-hook support that the bait-hook will be held in or about a vertical position when the trigger-bar is in fine adjustment with the gate-orifice.

When a mouse (or, rat if the trap is for such animals) enters the box A through the free open end and touches the bait either accidentally or to nibble a portion of the same, the end of the trigger-bar is dislodged and the gate B released to fall behind the mouse, which is thus encaged securely, as the end of the trigger-bar *e* will enter the hole *g'* and lock the gate shut.

Having thus described my invention, I claim as new and desire to secure by Letters Patent—

1. The combination, with a box having one open end, a bait-hook pendent within, and a trigger-bar supported to slide and loosely secured by one end to the bait-hook, of a vertical gate which is adapted to slide and close the end of the trap-box, and further provided with an aligning orifice which may be engaged by the free end of the trigger-bar when the gate is in open adjustment, substantially as set forth.

2. The combination, with a rectangular box having a wired front end and an open rear end which is grooved on its sides and bottom near this end to receive a sliding gate, of a gate that is weighty and that is provided with a trigger-aperture and check-lugs which engage a stop-rod when raised, a pendent bait-hook within, and a free sliding trigger-bar supported in a horizontal plane, one end loosely engaging the upper end of the bait-hook and the free end adapted to have a loose adjustment within the aperture of the sliding gate, substantially as set forth.

WALTER PEAD.

Witnesses:
JAS. LLOYD,
ARTHUR ROBERT HUMFRYES.